United States Patent
Dubiel et al.

(10) Patent No.: US 7,798,307 B2
(45) Date of Patent: Sep. 21, 2010

(54) APPARATUS FOR ALIGNING FASTENERS HAVING RADIALLY SYMMETRICAL POLYGONAL HEADS IN A FEED DEVICE

(75) Inventors: Gerhard Dubiel, Ruhla (DE); Ralf Zeyda, Tambach-Dietharz (DE)

(73) Assignee: Ejot GmbH & Co. KG, Bad Laasphe (DE)

( * ) Notice: Subject to any disclaimer, the term of this patent is extended or adjusted under 35 U.S.C. 154(b) by 37 days.

(21) Appl. No.: 12/230,624

(22) Filed: Sep. 2, 2008

(65) Prior Publication Data

US 2009/0078094 A1 Mar. 26, 2009

(30) Foreign Application Priority Data

Sep. 25, 2007 (DE) .................. 10 2007 045 757

(51) Int. Cl.
*B25B 23/06* (2006.01)

(52) U.S. Cl. .................. 198/389; 198/390; 193/46; 81/431

(58) Field of Classification Search .......... 198/389, 198/390; 193/46; 81/431
See application file for complete search history.

(56) References Cited

U.S. PATENT DOCUMENTS

| | | | | |
|---|---|---|---|---|
| 2,247,500 A | * | 7/1941 | Hutchison, Jr. | 81/125 |
| 2,653,497 A | * | 9/1953 | Ebert et al. | 193/46 |
| 2,683,487 A | * | 7/1954 | Conner | 83/97 |
| 2,895,360 A | * | 7/1959 | Madsen | 81/57.23 |
| 3,750,925 A | | 8/1973 | Schmidt et al. | |
| 4,265,072 A | * | 5/1981 | Egli | 53/501 |
| 4,841,832 A | | 6/1989 | Snavely et al. | |
| 5,398,860 A | | 3/1995 | Edwards et al. | |
| 6,116,401 A | * | 9/2000 | Carleton | 193/46 |
| 2004/0243139 A1 | * | 12/2004 | Lewis et al. | 606/104 |

FOREIGN PATENT DOCUMENTS

| | | |
|---|---|---|
| DE | 4 84 109 A | 10/1929 |
| DE | 22 59 330 C3 | 6/1973 |
| DE | 8324773 U1 | 8/1985 |
| DE | 693 13 711 T3 | 4/1998 |
| DE | 197 50 741 A1 | 6/1998 |

* cited by examiner

*Primary Examiner*—Mark A Deuble
(74) *Attorney, Agent, or Firm*—Birch, Stewart, Kolasch & Birch, LLP

(57) ABSTRACT

The invention relates to an apparatus for aligning fasteners having radially symmetrical polygonal heads in a device for feeding these fasteners to a processing station. A tubular piece having axially running grooves in its interior is provided in a feed channel for the fasteners, the number of these grooves corresponding to the number of edges on the heads of the fasteners, and the diameter of the groove corners on the inlet side of the tubular piece being greater than the width across the corners of the polygonal heads, the grooves tapering from a large width to a narrow width in the transport direction in such a way that fasteners entering the tubular piece are captured with a great clearance in relation to the grooves and leave the tubular piece with narrow clearance and therefore in the aligned position.

4 Claims, 2 Drawing Sheets

APPARATUS FOR ALIGNING FASTENERS HAVING RADIALLY SYMMETRICAL POLYGONAL HEADS IN A FEED DEVICE

The invention relates to an apparatus for aligning fasteners having polygonal heads in a device for feeding these fasteners to a processing station. These fasteners may be, for example, hexagon head screws, polygonal nuts, polygonal rivets and the like.

When these types of fasteners are fed to a processing station, a problem regularly arises in that, due to the necessary non-torsional gripping of the fasteners in a processing station, the fasteners are available in an aligned position for the active pickup elements in the processing station, i.e. in the case of hexagon head screws, the associated hexagon head is aligned in such a manner that the fed fastener is fed to a pickup member securely gripping the hexagon head in a position aligned with the pickup member.

An active alignment apparatus in this sense is disclosed in German unexamined patent application DE 197 50 741 A1. The fasteners to be processed according to this publication are rivetable parts having a head, in particular for processing on garments, which are fed to a circular conveyor device in an alignment position in which these parts are rotated by an alignment surface applied to them and thereby brought into in correspondence with a countersurface on an alignment rail. If the alignment surface is brought into matching contact with the alignment rail, the corresponding part is further transported in the position aligned therewith and can then be processed accordingly. The method of rotating the particular part until its surface rests against the aforementioned countersurface is unusable in many cases, since fasteners of this type are usually transported in tubes, hoses and the like, which make it impossible to access the fasteners from the outside.

The object of the invention is therefore to provide an apparatus for aligning fasteners of the aforementioned type, in which access to the fasteners from the outside is avoided. According to the invention, this is accomplished by providing a tubular piece having axially running grooves in its interior in a feed channel for the fasteners, the number of these grooves corresponding to the number of edges of the heads of the fasteners, and the diameter of the groove corners on the inlet side of the tubular piece being greater than the width across the corners of the polygonal heads, the grooves tapering from a large width to a narrow width in the transport direction in such a way that fasteners entering the tubular piece are captured with a great clearance in relation to the grooves and leave the tubular piece with narrow clearance and therefore in the aligned position.

By mounting the tubular piece having grooves running axially in its interior in the feed channel, the fed fasteners are aligned in a desired angular position without external intervention into the feed channel being necessary, since the externally inaccessible alignment means themselves are mounted in the feed channel and force the fasteners into the desired position for further processing as they pass through the tubular piece. The fasteners are picked up by the tubular piece, the edges of the heads of the fasteners extending into the grooves and then being rotated, if necessary, by the grooves tapering in the transport direction until the fasteners leave the outlet side of the tubular piece in the forced angular position against the tubular piece, thereby exiting the tubular piece for a processing tool in a position adapted to this tool.

The alignment of the fasteners in the tubular piece may be improved, in particular, with regard to the final angular position of the fastener in that the edges of the grooves running from the inlet side of the tubular piece to the outlet side turn into surfaces connecting the grooves, which are cross-sectionally adapted to the heads of the fasteners in such a way that the fasteners exit at the outlet side with narrow clearance. By designing the tubular piece in this manner, the fasteners inserted therein are first roughly aligned by the edges of the grooves in order to reach the region of the surfaces connecting the grooves, these surfaces ultimately corresponding to the cross-section of the heads of the fasteners on the outlet side so that a particularly accurate alignment of the fasteners in terms of their angular position is achievable by these surfaces.

The use of the tubular piece is particularly advantageous in that the fasteners are transportable through the tubular piece having their heads facing forward or having their heads at the rear end of the fastener, since the tubular piece may align the angular position of the fasteners with the grooves or surfaces independently of the longitudinal position of the fasteners.

Exemplary embodiments of the invention are illustrated in the figures, where:

FIG. 4 shows a perspective view of the inlet side of a tubular piece according to FIG. 2;

Figure 2:
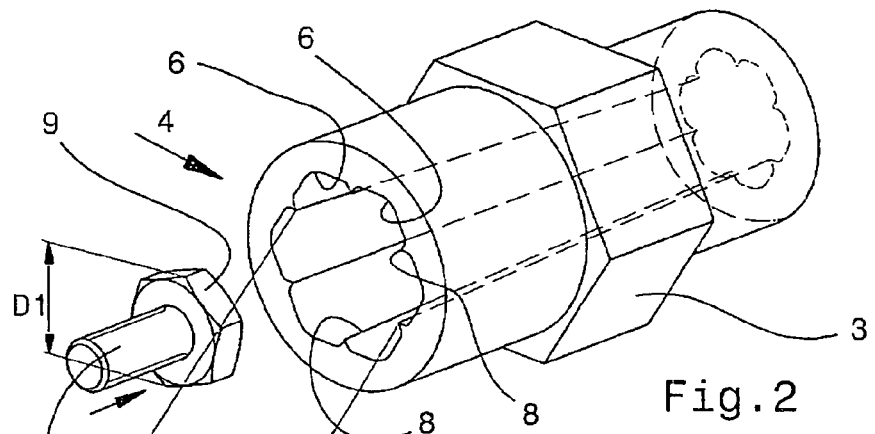
FIG. 2 shows the tubular piece and a fastener in the form of a hexagon head screw that is held in front of the inlet side of the tubular piece.
Figure 5:
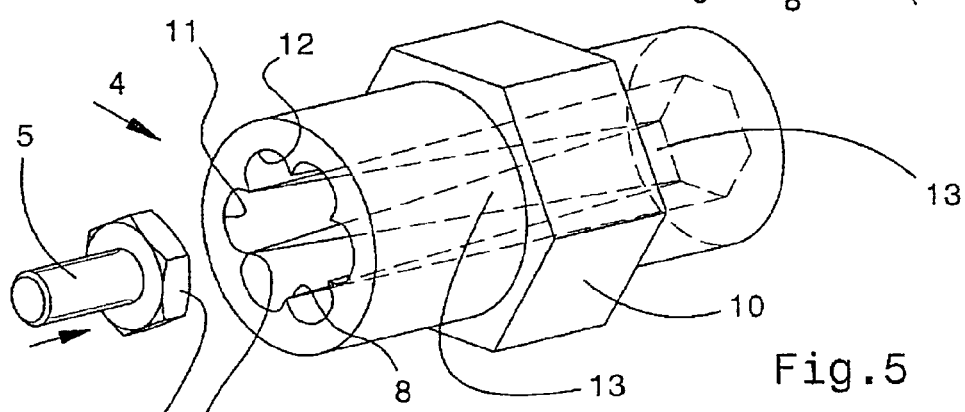
FIG. 5 shows a system similar to that in FIG. 2, having a tubular piece including grooves and surfaces connecting these grooves.

FIG. 7 a top view of the inlet side of the tubular piece according to FIG. 2, illustrating the diameter relationships between the fasters and tubular piece;

FIG. 8 shows a top view of the outlet side of the system according to FIG. 5.

Figure 1:
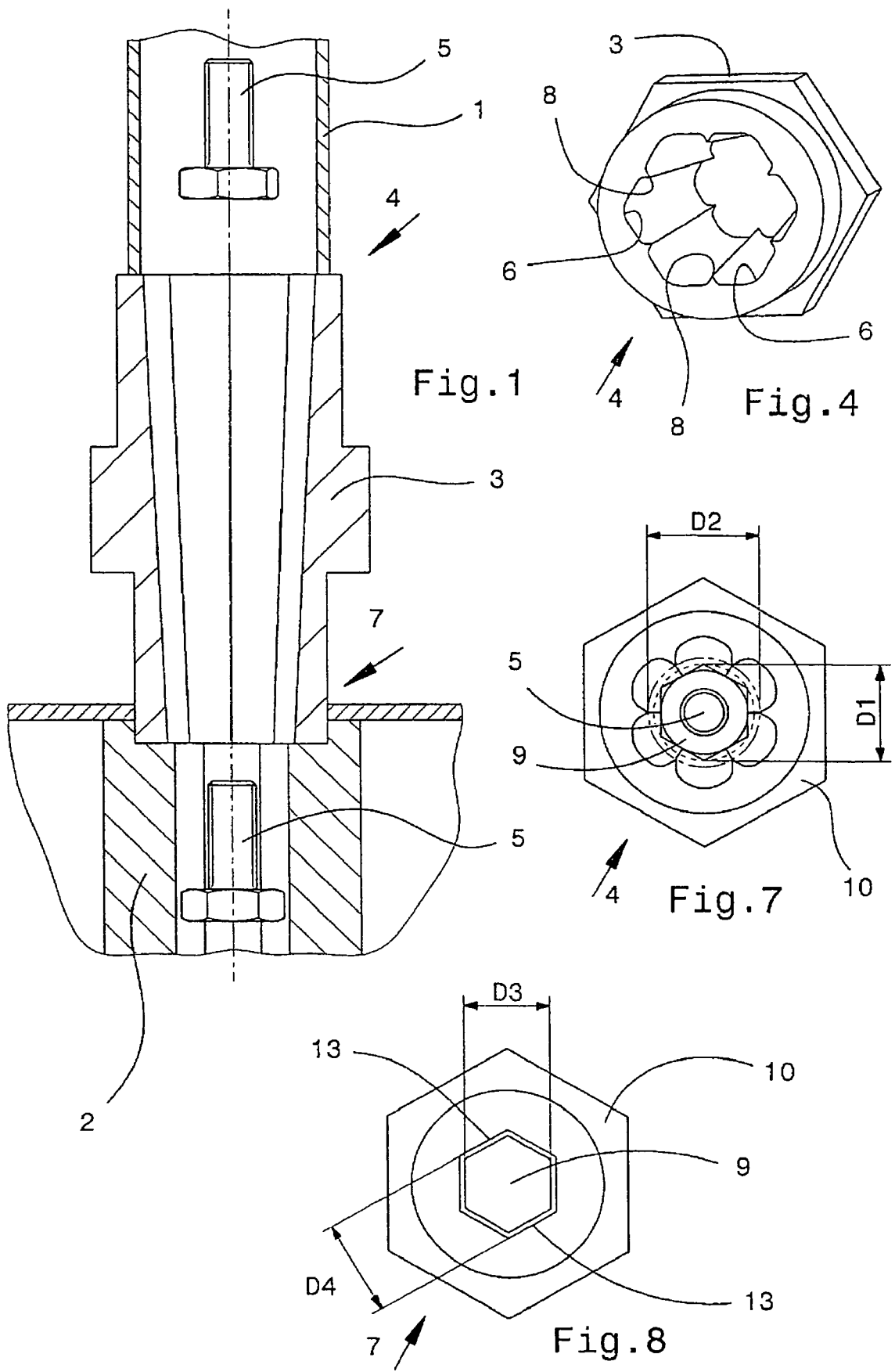
FIG. 1 shows a schematic representation of a device combination for feeding fasteners to a processing station, having an intermediate tubular piece for aligning the fasteners.

FIG. 1 shows a schematic diagram of an apparatus for aligning fasteners having radially symmetrical polygonal heads, the apparatus including a feed device 1 for the fasteners and a processing station 2. Feed device 1 is connected to processing station 1 via a tubular piece 3, which is used to align transported fasteners and whose function and structure are illustrated specifically in the following figures.

FIG. 2 shows a perspective view of tubular piece 3 with its inlet side 4 facing the viewer. The fastener, which is represented by a hexagon head screw 5 whose hexagon head 9 faces inlet side 4 and is to be inserted into tubular piece 3 during the movement of fastener 5, is shown in front of inlet side 4.

Tubular piece 3 contains six axially running grooves 6, which pass through entire tubular piece 3 and are visible in a cross-sectional view on outlet side 7 illustrated FIG. 3, this arrangement being explained in greater detail below.

Figure 3:
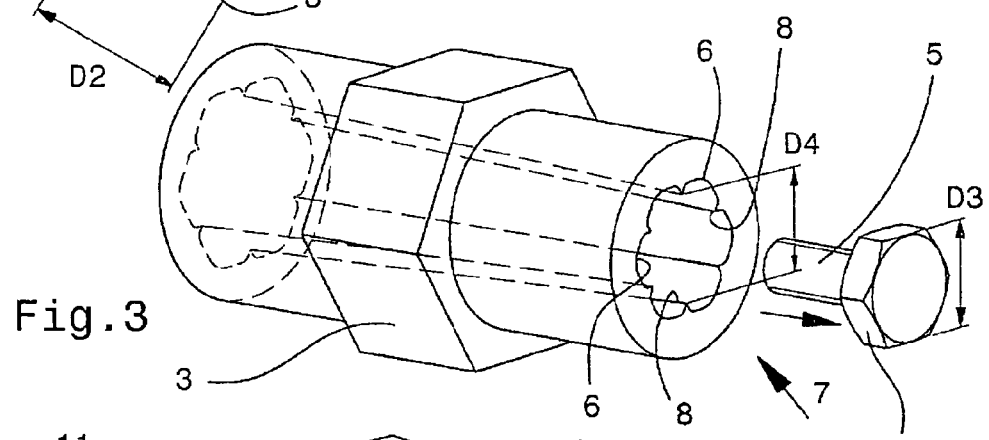
FIG. 3 shows the system according to FIG. 3 in a view of the outlet side of the tubular piece and a hexagon head screw being transported therefrom.

Grooves 6 illustrated in FIG. 2 are separated from each other by edges 8, which run the entire length of tubular piece 3 and are thus visible on the outlet side of tubular piece 3 (see FIG. 3).

The size of diameter D2 (also see FIG. 7) defined by edges 8 of grooves 6 running the length of tubular piece 3 is selected in such a way that it is greater than the width across the corners D1 of polygonal head 9 of fastener 5, so that the latter is easily insertable into inlet side 4 of tubular piece 3.

During the course of the process (FIG. 3) of passing hexagon head screw 5 though tubular piece 3, edges 8 of grooves 6 come into contact with the surfaces of polygonal head 9, thereby aligning the latter with regard to its angular position in relation to tubular piece 3 in such a way that hexagon head screw 5 is guided by groove corners 8 in a position in which the corners of the hexagon head screw extend into the curvatures of grooves 6.

Due to the tapering of grooves 6 passing through tubular piece 3, this process results in fastener 5 exiting on outlet side 7 finally emerging therefrom in a precise angular orientation toward tubular piece 3, make it possible to directly grip the fastener in the processing station.

While grooves 6 on inlet side 4 surround hexagon head screw 5 with a great amount of clearance, only a narrow clearance in relation to hexagon head 9 is provided on the outlet side of tubular piece 3, due to the narrowing of groves 6 in that location, for which purpose the width across the corners of polygonal head 9, namely dimension D3, leaves only a narrow clearance in relation to grooves 6 on the outlet side of tubular piece 3.

FIG. 4 illustrates a perspective representation, viewed from above, of inlet side 4 of tubular piece 3, which shows grooves 6 and edges 8 separating the grooves, the edges approaching one another and extending all the way through tubular piece 3 to its outlet side (see FIG. 3).

FIG. 5 shows a modification of the design of the tubular piece according to the figures discussed above. Tubular piece 10 illustrated here also contains grooves 11, 12 and additional grooves, each of which initially forms an edge 8 at inlet side 4, these edges expanding to form a surface 13 during the further course of their passage through tubular piece 10, and this surface extending to the outlet side of tubular piece 10.

Figure 6:
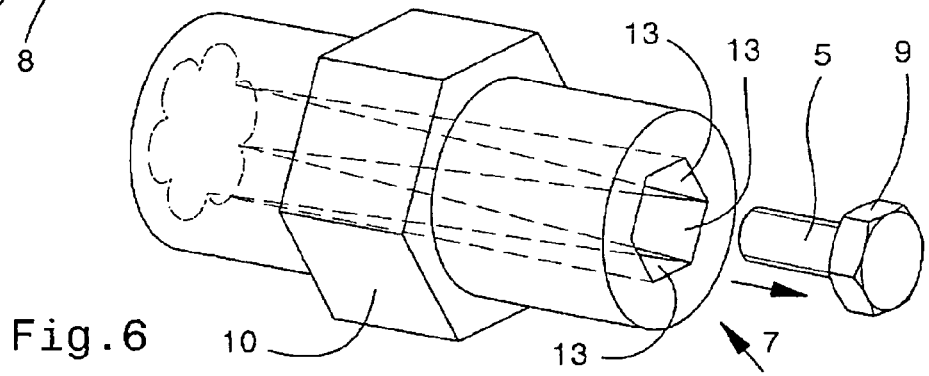
FIG. 6 shows a system similar to the illustration in FIG. 3, the surfaces lying between the grooves being clearly visible on the outlet side.

FIG. 6 illustrates a perspective representation of outlet side 7 of tubular piece 10, this representation clearly showing surfaces 13 (and additional surfaces) between the remaining narrowed grooves 11 and 12, these surfaces approaching each other radially toward the inside and thereby narrowing the through-hole in tubular piece 10. This narrowing enables the through-hole in tubular piece 10 to be adapted to the shape of hexagon head 9 of hexagon head screw 5, which is guided by surfaces 13 connecting grooves 11 and 12 with only a narrow clearance and thus assumes a very precise and limited dimension in terms of its angular position.

FIG. 7 shows a top view of inlet side 4 of tubular piece 3, the width across the corners of illustrated hexagon head 9 being indicated by a dotted circular line, and diameter D2 of the groove corners being represented by a segmented line. FIG. 7 clearly shows that the illustrated fastener having polygonal head 9 is insertable into the inlet side of tubular piece 3 in any angular position, whereupon either corners 8 according to FIG. 1 or surfaces 13 according to FIG. 4 act upon the fastener as it passes through tubular piece 3 and then align hexagon head 9 accordingly.

This alignment on the basis of surfaces 13 is illustrated in FIG. 8, which shows the outlet side of tubular piece 10, where surfaces 13 and the hexagonal cross section of hexagon head 9 are clearly visible.

The invention claimed is:

1. An apparatus for aligning fasteners having radially symmetrical polygonal heads in a device for feeding the fasteners to a processing station, in which a tubular piece has a feed channel for the fasteners comprising:
   axially running grooves formed in an interior of the tubular piece, said axially running grooves being provided in the feed channel for the fasteners, the number of the axially running grooves corresponding to the number of edges of the heads of the fasteners;
   an inlet side formed at a first end of the tubular piece;
   an outlet side formed at a second end of the tubular piece, said outlet side being displaced a predetermined distance relative to the inlet side;
   said axially running grooves including a curvature on the inlet side of the tubular piece being greater that a distance extending across the polygonal heads of the fasteners, the grooves tapering from a large width to a narrow width in a transport direction in such a way that fasteners entering the tubular piece are captured with a large clearance in relation to the grooves and leave the tubular piece with a narrow clearance and thus in their aligned position, whereby edges of the grooves turn into surfaces connecting the grooves from the inlet side of the tubular piece to the outlet side, the cross-sections of these surfaces being adapted to the polygonal heads of the fasteners in such a way that the fasteners exit with the narrow clearance on the outlet side in their aligned position.

2. An apparatus for aligning fasteners having radially symmetrical polygonal heads in a device according to claim 1, wherein the tubular piece includes six axially running grooves extending from the inlet side to the outlet side of the tubular piece.

3. An apparatus for aligning fasteners having radially symmetrical polygonal heads in a device according to claim 2, wherein the fastener includes a hexagon head for mating with the six axially running grooves extending from the inlet side to the outlet side of the tubular piece.

4. An apparatus for aligning fasteners having radially symmetrical polygonal heads in a device according to claim 1, wherein the surfaces are edges formed between adjacent axially running grooves, said surfaces extending from the inlet side to the outlet side of the tubular piece.

* * * * *